United States Patent
Park

(10) Patent No.: US 7,133,364 B2
(45) Date of Patent: Nov. 7, 2006

(54) APPARATUS AND METHOD FOR INTERNET TELEPHONE COMMUNICATION

(75) Inventor: Min Soo Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 1052 days.

(21) Appl. No.: 09/899,011

(22) Filed: Jul. 3, 2001

(65) Prior Publication Data

US 2002/0057675 A1    May 16, 2002

(30) Foreign Application Priority Data

Nov. 10, 2000 (KR) ............................... 2000-66839

(51) Int. Cl.
*G01R 31/08* (2006.01)
*H04L 12/66* (2006.01)

(52) U.S. Cl. ................... 370/231; 370/235; 370/356

(58) Field of Classification Search ............... 370/356, 370/394, 216, 218, 231; 379/88.16

See application file for complete search history.

(56) References Cited

U.S. PATENT DOCUMENTS

| | | | | |
|---|---|---|---|---|
| 5,442,637 A * | 8/1995 | Nguyen | ...................... | 714/708 |
| 5,930,233 A * | 7/1999 | Kanerva et al. | ............. | 370/231 |
| 5,963,551 A * | 10/1999 | Minko | ........................ | 370/356 |
| 6,031,818 A * | 2/2000 | Lo et al. | ...................... | 370/216 |
| 6,208,620 B1 * | 3/2001 | Sen et al. | .................... | 370/231 |
| 6,424,647 B1 * | 7/2002 | Ng et al. | ..................... | 370/352 |
| 6,466,574 B1 * | 10/2002 | Fujisaki et al. | ............. | 370/356 |
| 6,556,561 B1 * | 4/2003 | Himbeault et al. | ......... | 370/352 |
| 6,587,985 B1 * | 7/2003 | Fukushima et al. | ......... | 714/748 |
| 6,643,496 B1 * | 11/2003 | Shimoyama et al. | ......... | 455/69 |
| 6,650,652 B1 * | 11/2003 | Valencia | ..................... | 370/433 |
| 6,657,997 B1 * | 12/2003 | Lide et al. | .................. | 370/356 |
| 6,678,267 B1 * | 1/2004 | Anandakumar et al. | .... | 370/356 |
| 6,681,252 B1 * | 1/2004 | Schuster et al. | ............ | 709/227 |
| 6,704,309 B1 * | 3/2004 | Nada et al. | ................. | 370/389 |
| 6,751,209 B1 * | 6/2004 | Hamiti et al. | ............... | 370/349 |

* cited by examiner

*Primary Examiner*—Doris H. To
*Assistant Examiner*—Ian N. Moore
(74) *Attorney, Agent, or Firm*—Lee, Hong, Degerman, Kang & Schmadeka

(57) ABSTRACT

An internet telephone communication system including a voice transmitting and receiving parts and a method of operating the system are disclosed. The voice transmitting part retransmits voice data packets at least once through an internet network according to a retransmission frequency information packet received from the voice receiving part. The voice receiving part transmits the retransmission frequency information packet to the voice transmitting part in order to request to retransmit the voice data packets R times, where R is determined based a data loss rate calculated. By retransmitting the voice data packets, the transmitting rate of the data and the corresponding VOIP conversation quality are greatly improved.

17 Claims, 4 Drawing Sheets

APPARATUS AND METHOD FOR INTERNET TELEPHONE COMMUNICATION

BACKGROUND OF THE INVENTION

1. Field of the Invention

The present invention relates to an internet telephone communication system, and more particularly, to an internet telephone communication system that improves a VOIP conversation quality by varying a number of retransmissions based on the data loss rate of the voice data packets received.

2. Background of the Related Art

In a telephone communication system using an internet network, analog voice signals are initially digitalized, encoded, and get transmitted in forms of voice data packets by a transmitter. A receiver then receives the voice data packets sent, converts them to analog signals, and outputs the analog signals through a speaker.

FIG. 1 illustrates a typical internet telephone communication system. According to FIG. 1, the system includes a voice transmitting part that digitalizes and encodes a voice signal and sends the encoded voice data in forms of voice data packets through an internet network; and a voice receiving part that receives the voice data packets and restores the voice data so that the data can be heard. First, the voice transmitting part includes a microphone 101 for receiving a voice signal; an ADC (analog to digital converter) 102 for digitalizing the analog voice signal received from the microphone 101; a voice coder 103 for compressively encoding the digitalized voice signal; and a transmitting protocol processor 104 for generating voice data packets by processing the compressed voice data in accordance to an internet protocol and sending the voice data packets through an internet network 105. The voice receiving part includes a receiving protocol processor 106 for receiving the voice packets transmitted through an internet network 105 and extracting the compressed voice data; a voice decoder 107 for restoring the compressed voice data; a DAC (digital to analog converter) 108 for converting the stored data into analog signals; and a speaker 109 for outputting the converted analog signals.

The system illustrated in FIG. 1 works as follows. First of all, a voice signal generated from a sender is inputted to the microphone 101, and the ADC 102 converts the signal to digital voice data. After the voice coder 103 compressively encodes the digitalized voice data to increase the transmission efficiency, supplemental data such as header and trailer data are added to the compressed voice data in the transmitting protocol processor 104, and the data get transmitted through the internet network 105 in forms of the voice data packets. Then the protocol processor 106 of the receiving part receives the transmitted data, eliminates the supplemental data (i.e., header and trailer) and extracts the compressed voice data. The extracted voice data are then restored in the voice decoder 107, and the DAC 108 converts the restored digital voice data to an analog signal. Finally, the speaker 109 outputs the converted analog voice signal.

However, the internet phone system described above has a problem that the VOIP conversation quality is drastically decreased when some of the voice packets are lost during the transmission or signal process steps. When they are lost in the internet network, empty spaces will be included instead in the received voice data, and the telephone receiver will hear discontinuous sound so that it will be difficult to understand what the caller says. Therefore, since the system does not have any mechanism to prevent such voice packet losses or to correct the error caused by such losses, such losses result a poor VOIP conversation quality.

SUMMARY OF THE INVENTION

Accordingly, the present invention is directed to an internet phone communication system and a corresponding method of using the system that substantially obviates one or more problems due to limitations and disadvantages of the related art.

An object of the present invention is to provide an internet telephone communication system and a method of operating the system in which a voice receiving part can request to retransmit the voice data packets based on the data loss rate of the voice data packets received.

Another object of the present invention is to provide an internet telephone communication system in which a voice transmitting part can update the frequency of the retransmission of the voice data packets based on the data loss rate of the received voice data packets.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an internet telephone communication system includes a voice receiving part receiving a set of voice data packets through an internet network and sending a retransmission frequency information packet requesting to retransmit a same set of voice data packets R times, R being a retransmission frequency and being determined based on a data loss rate of the voice data packets received; and a voice transmitting part retransmitting the same set of voice data packets R times through an internet network according to the retransmission frequency information packet received.

The voice transmitting part includes a formation time information adder for adding formation time information to compressively encoded voice data received; a copy generator for generating R copies of the compressively encoded data containing the formation time information; and a transmitting protocol processor for generating voice data packets based on the R copies generated and sending the voice data packets to the voice receiving part. On the other hand, the voice receiving part includes a data eliminator for leaving only one set of data among sets of compressed voice data that are repeatedly received and deleting all other data; a data loss determiner for determining whether the only set of data left is damaged and calculating a corresponding data loss rate; and a retransmission frequency determiner for determining a retransmission frequency based on the data loss rate and sending a retransmission frequency information packet containing the updated frequency to the transmitting part. The retransmission frequency is determined by comparing the data loss rate calculated with a first and second allowed data loss values set by a user. The frequency increases by one if the data loss rate is greater than 5% and decreases by one if the data loss rate is less than 1%. Additionally, the data eliminator deletes other voice data received using formation time information attached to the voice data.

In another aspect of the present invention, a method of operating an internet telephone communication system having a voice transmitting part and a voice receiving part, the method includes calculating a data loss rate of voice data packets received during a given time interval by the voice receiving part; updating a retransmission frequency by increasing the frequency by one if the data loss rate is greater than a maximum allowed value and decreasing the frequency by one if the data loss rate is less than a minimum allowed value; transmitting a retransmission frequency information packet to the voice transmitting part, the information packet containing the updated frequency; and transmitting each voice data packet from the transmitting part to the receiving part R times, R being the updated frequency. Additionally, the retransmission frequency will not be updated if the data loss rate is between the maximum allowed value and the minimum value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
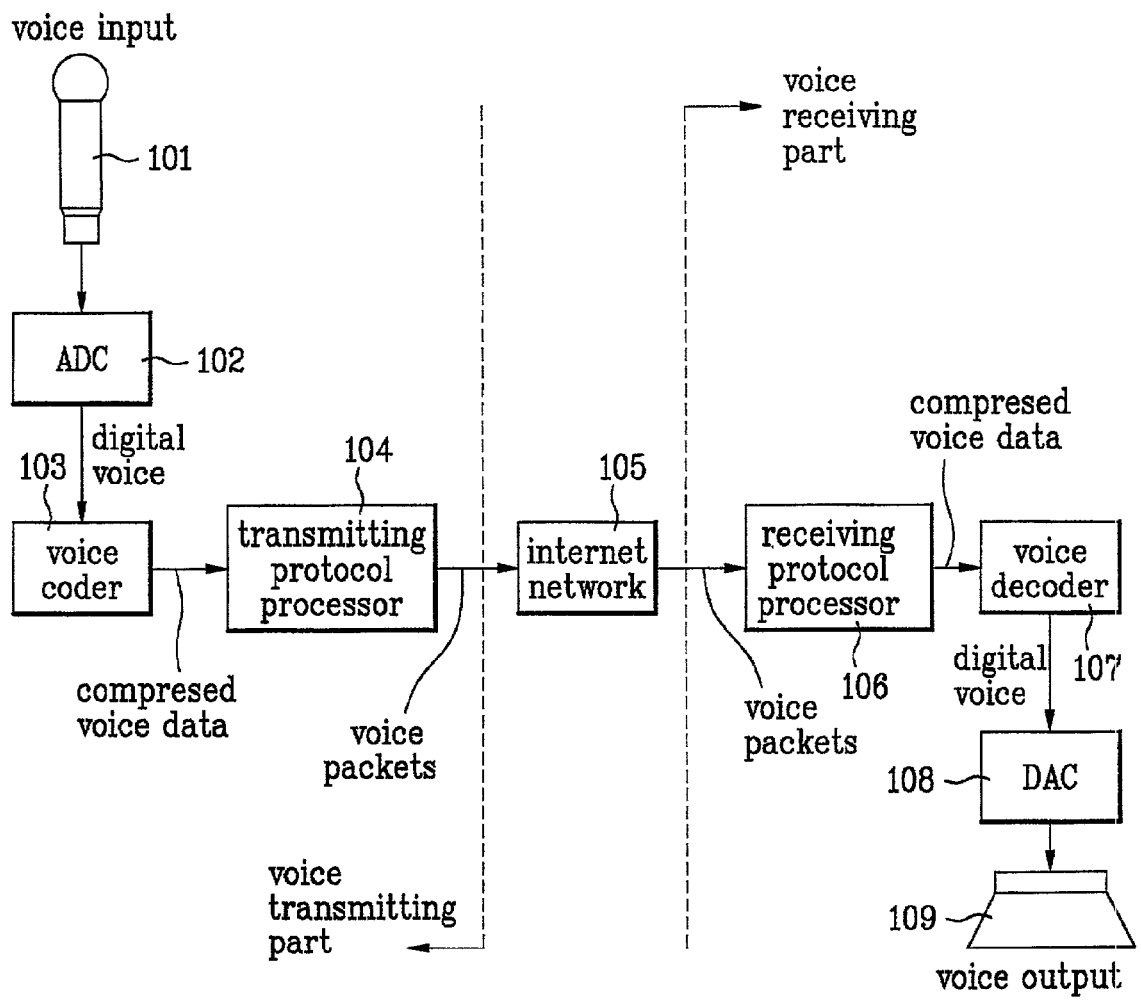
FIG. 1 illustrates a typical internet telephone communication system.
Figure 2:
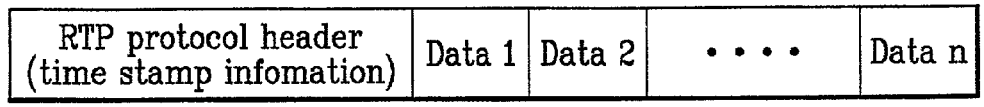
FIG. 2 is a diagram showing the format composition of a voice data packet.
Figure 3:
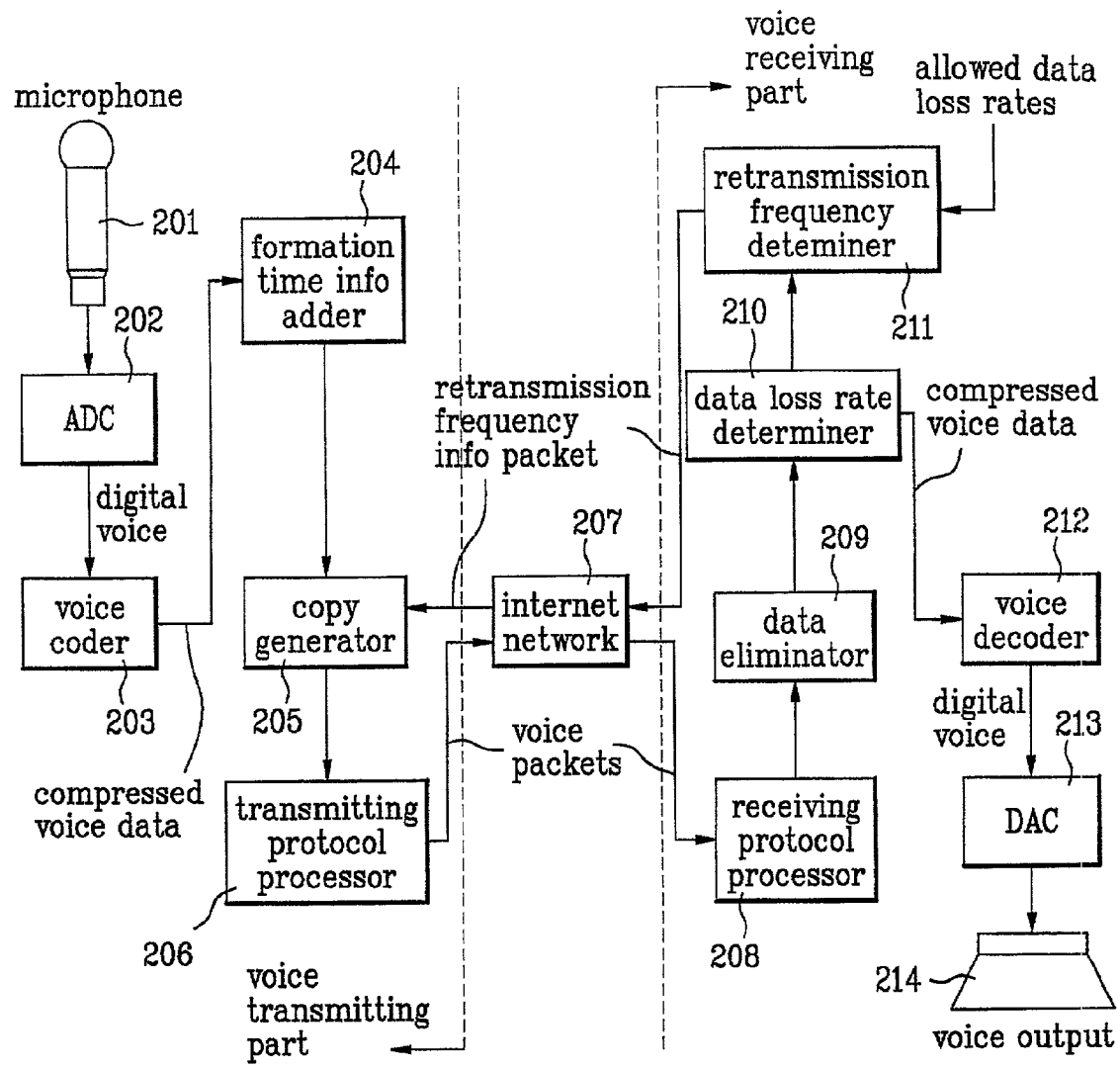
FIG. 3 illustrates an embodiment of an internet telephone system according to the present invention.

FIG. 2 is a diagram showing the format composition of a voice data packet. FIG. 3 illustrates an embodiment of an internet telephone communication system according to the present invention. As shown in FIG. 3, the internet telephone communication system includes a voice transmitting part that compressively encodes the voice data and transmit a number of copies of the packet data through an internet network; and a voice receiving part that receives the transmitted packet data, determines the retransmission frequency based on the data loss rate of the voice data packets received, sends a retransmission frequency information packet containing the retransmission frequency, and restores the received voice data.

The voice transmitting part includes a microphone 201 for inputting a voice signal; an ADC 202 for converting the analog signal received by the microphone 201 into a digital signal, a voice coder 203 for compressively encoding the digitalized signal; a formation time information adder 204 for adding the formation time information to the compressed voice data; a copy generator 205 for copying the data including the formation time information a given number of times; and a transmitting protocol processor 206 for generating corresponding voice packets according to the internet protocol.

On the other hand, the voice receiving part of the internet telephone communication system includes a receiving protocol processor 208 for receiving the voice data packets transmitted through an internet network 207 and extracting the compressed voice data; a data eliminator 209 for leaving only one set of voice data and eliminating all other voice data by using their formation time information, a data loss rate determiner 210 for determining whether the voice data received have any data loss and calculating a data loss rate if they have any; a retransmission frequency determiner 211 for determining a retransmission frequency after comparing the data loss rate calculated in the data loss rate determiner 210 with allowed values set by a user and transmitting the retransmission frequency information to the voice transmitting part; a voice decoder 212 for restoring the compressed voice data; a DAC 213 for converting the restored data to an analog signal; and a speaker 214 for outputting the converted analog signal.

Figure 4:
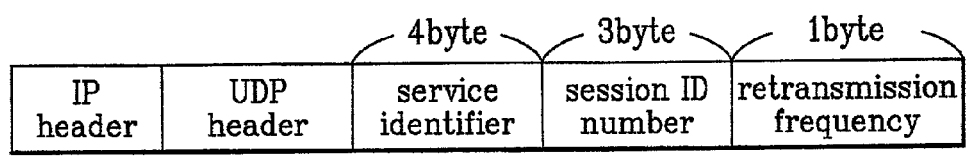
FIG. 4 is a diagram showing the format of a retransmission frequency information packet.
Figure 5:
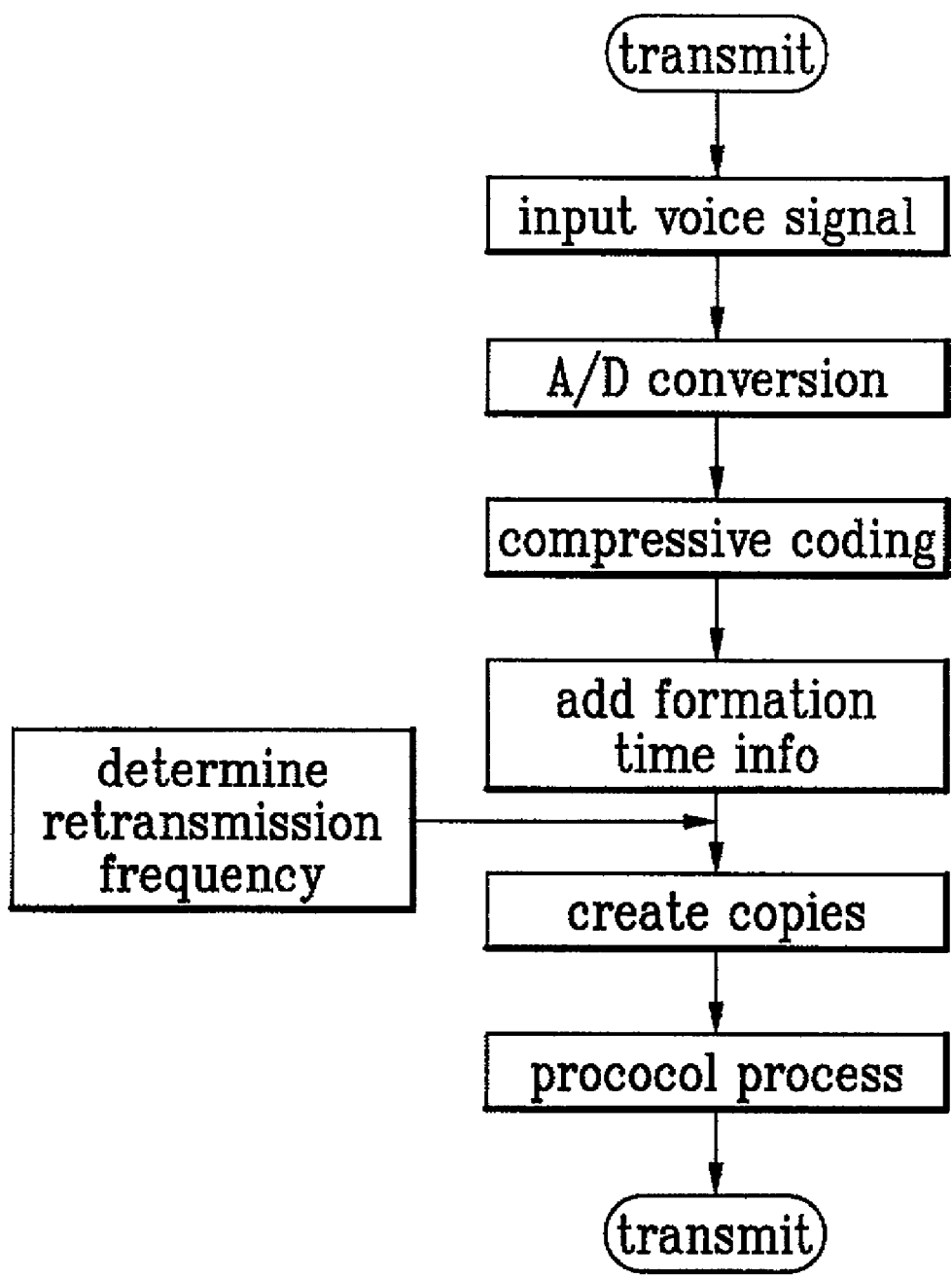
FIG. 5 is a flow chart showing an operational procedure of a voice transmitting part of an internet telephone communication system according to the present invention.

FIG. 4 is a diagram showing the format of a retransmission frequency information packet. The ways the voice transmitting/receiving parts of the internet telephone communication system according to the present invention works are explained using FIG. 3 and FIG. 4 as follows.

First of all, a voice signal of a voice sender is inputted to the microphone 201, and the voice signal converts to the digital voice data by the ADC 202. The voice coder 203 then compressively encodes the digital voice data to increase the transmission efficiency, and the compressed voice data are inputted to the formation time information adder 204. The formation time information adder 204 adds the formation time information corresponding to the compressed voice data. For example, 2 bytes are used to store the formation time information, and the time the internet phone system is turned on becomes zero and increases by one after a predetermined amount of time. The formation time is limited: for example, it can be limited to 20 or 30 minutes. When the formation time exceeds the limited value, it restarts from zero.

The formation time information format will be explained in this paragraph. The time stamp is used also for an existing RTP protocol, but it is too long (32 bits) and has no consistency due to the type of the payload. Therefore, an additional time stamp will be used in the present invention. The time stamp of the present invention is fairly short so that it reduces the time for comparing. The formation time data format has a 10 msec length per unit and has the 655.35 sec maximum formation time. Therefore, when the time stamp exceeds 655.35 sec, it restarts from zero again. As explained earlier, the compressed voice data including the formation time information is inputted to the copy generator 205, and the copy generator 205 generates the predetermined number of copies of the compressed voice data and sends the copies to the transmitting protocol processor 206 of the voice receiving part. The protocol processor 206 then adds supplemental information (header/trailer) to the compressed voice data containing the formation time information and the copies of the data. Then the voice data are transmitted through the internet network 207 in forms of the data packets.

Figure 6:
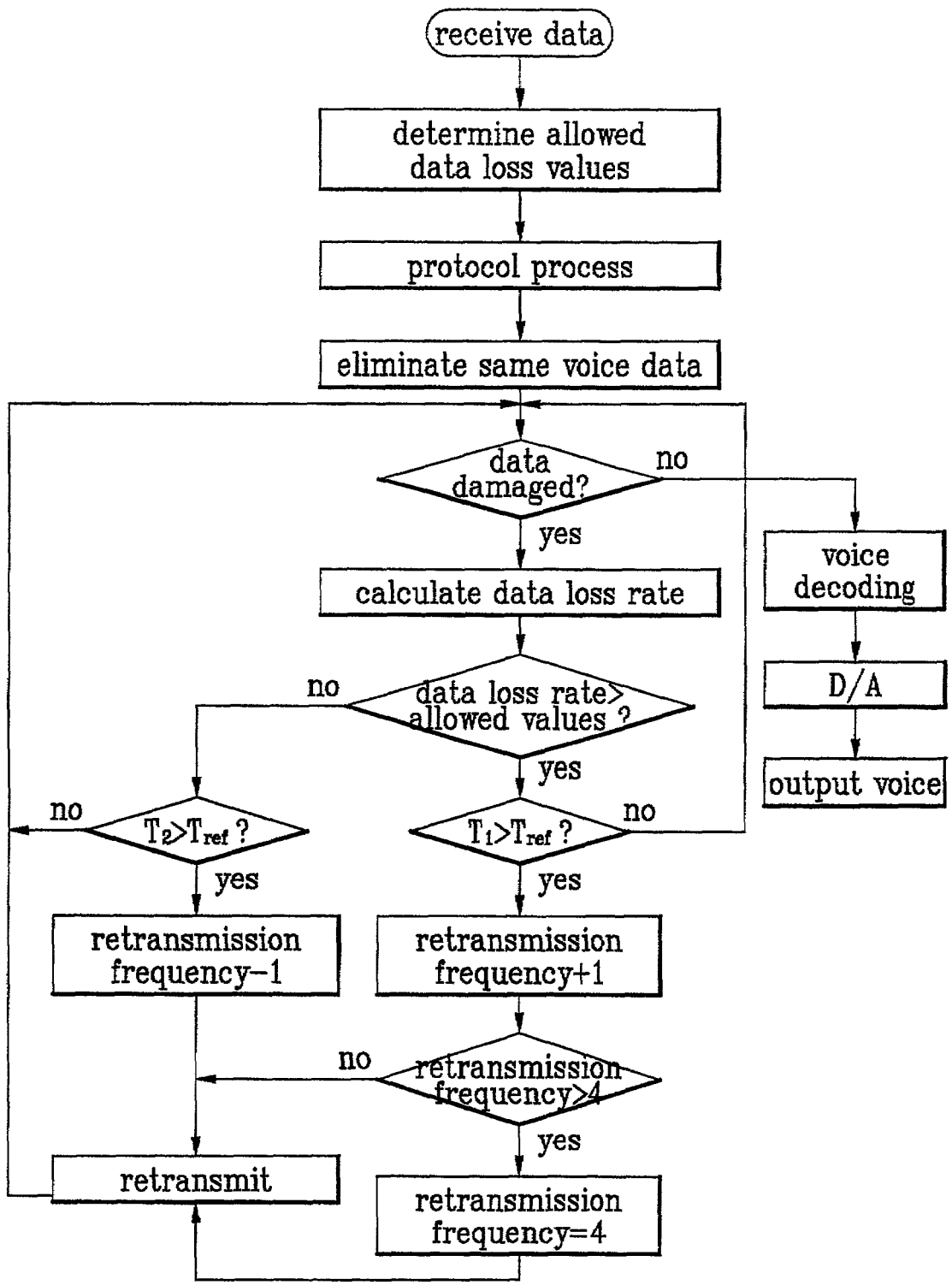
FIG. 6 is a flow chart showing an operational procedure of a voice receiving part of an internet telephone communication system according to the present invention.

Next, a method for transmitting/receiving the voice data using the internet telephone communication system is will be explained in this section using FIG. 3 and FIG. 6. First, the user determines first and second allowed voice data loss rates based on a desired conversation quality the user wishes to have during the conversation, and this values are set in the retransmission frequency determiner 211. Thereafter, the voice data transmitted through the internet network 207 are received by the receiving protocol processor 208, and the protocol processor 208 eliminates the supplemental information (header/trailer) and extracts only the compressed voice data. Then the extracted voice data are inputted to the data eliminator 209, and the data eliminator 209 eliminates the other same data having identical formation time information. The only data left is then inputted to the data loss rate determiner 210. The data loss determiner 210 determines whether a data loss has occurred: for instance, it finds the discontinuous part or a damaged portion of the data that cannot be restored. Additionally, the data loss rate determiner 210 can also check whether the voice data includes a missing part or can deem a region of the data as a damaged part if the amount of the received data is less than a limiting amount. Other various methods can be applied to estimate the data loss rate. According to the present invention, the determination of the voice data loss is done as follows. Since each voice data packet includes a RTP protocol data header, each packet contains a corresponding sequence number. Therefore, the data loss rate determiner 210 checks the increment of the sequence number while the voice data packets are received. When the sequence number increases by more than one, it deems that a data loss has occurred. As shown in FIG. 2, the location of the damaged data packet can be obtained from the time stamp information included in the RTP protocol header. In other words, the information at the time when the data loss is occurred can be obtained from the time stamp information. The time of the data loss occurrence can be calculated by adding the formation time of the damaged voice data packet to the time stamp of the prior data packet. If it is determined in the data loss rate determiner 210 that there is no data loss, the same voice data packets are deleted, and the only compressed voice data are transmitted to the voice decoder 212. The voice decoder 212 restores the voice data and inputs them to the DAC 213. The DAC then converts the data to an analog signal, and the speaker 214 outputs the analog signal. On the other hand, if the data loss determiner 210 determines that there is a data loss, then the data loss rate determiner 210 calculates the data loss rate and transmits it to the retransmission frequency determiner 211.

A method of calculating the data loss rate of the voice data packets received is explained in this paragraph. First of all, the data loss rate determiner 210 records the total number D of the voice data packet received during the 30 seconds period. Each packet should include both of the RTP protocol header and the packet sequence number. Thereafter, the data loss rate determiner 210 gets the number of packets supposed to be received by using the following equation:

$$T=M-N \quad \text{[Equation 1]}$$

where T is the number of the packets supposed to be received during the 30 seconds period, M and N are the maximum and minimum sequence numbers of the data packets received during the 30 seconds period. Next, the data loss rate determiner 210 calculates the data loss rate L by $$L(\text{data loss rate})=(T-D)/T \quad \text{[Equation 2]}$$

where D is the total number of the voice data packets received during the 30 seconds period.

The retransmission frequency determiner 211 increases the retransmission frequency by one when the time interval ($T_1$) during which the data loss rate is greater than the first allowed value 5% is longer than a predetermined time length ($T_{ref}$), and it sends the updated retransmission frequency information to the voice transmitting part. An upper limit of the retransmission frequency should be determined beforehand. The upper limit of the present invention is set to 4 since re-transmitting more than four times will completely eliminate the advantage of the voice data compression. In other words, if too many retransmissions occurs, the amount of the voice data will increase tremendously so that compressing the voice data for reducing the data is no more meaningful. Thus, the copy generator 205 of the voice transmitting part makes the copies according to the retransmission frequency information packet received and transmits the copies to the voice receiving part. Therefore, the transmission rate of the corresponding data can be increased.

On the other hand, the retransmission frequency determiner 211 decreases the retransmission frequency by one when the time interval ($T_2$) during which the data loss rate is less than the second allowed value 1% is longer than $T_{ref}$, and it sends the updated information to the voice transmitting part. The basis of selecting the first and second allowed data loss values as 5% and 1% is as follows. According to the experimental results, if the data loss rate is greater than 5%, "n" sound of the voice will be lost. In this case, the telephone user will have a difficulty to understand what the other person says because 5% corresponds to a syllabic length of the voice. On the other hand, 1% data loss rate is usually acceptable.

FIG. 4 illustrates a format diagram of a retransmission frequency information packet generated by the retransmission frequency determiner 211. It includes an IP header region, a UDP header region, a service identifier region, a session ID region, and a retransmission frequency region. The service identifier region indicates that the packet is for retransmission frequency information and has a size of four bytes (i.e., 0000 0000 0000 0000 0000 0000 0000 1111). The session ID region gets updated for a new call, and it has a size of three bytes. The retransmission frequency region represents a number of copies of the voice data packets that must be retransmitted. For example, C=0000 0001, C=0000 0010, C=0000 0100, and C=0000 1000 represent 1, 2, 3 and 4, respectively.

The algorithm to control the retransmission frequency is as follows. First, the data loss rate is calculated for every thirty seconds. The initial retransmission frequency R is set to 1. Thereafter, for every thirty seconds, if the data loss rate is greater than the first allowed value 5%, R increases by one. R can not be greater than four. On the other hand, R decrease by one if the data loss rate L is less than the second allowed value 1% for every thirty seconds. R can not be less than one. The copy generator generates R copies of the voice data corresponding to the retransmission frequency information received and sends the copies to the receiving part.

According to the present invention, the voice transmitting part adds the formation time information to the voice data and makes/sends R copies of the voice data, R being the transmission frequency calculated. After the voice receiving part leaves only one set of voice data and deletes all others, it increases or decreases the retransmission frequency based on the comparison between the calculated data loss rate and the allowed data loss rate values, and it sends the updated transmission frequency information to the voice transmitting part so that the transmission rate of the voice data is greatly improved. The voice receiving part controls the retransmission frequency based on the voice data transmission rate in order to improve the quality of the VOIP communication.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An internet telephone communication system comprising:
   a voice receiving part receiving a first set of voice data packets through an internet network and sending a retransmission frequency information packet requesting to retransmit a same set of voice data packets R times, R being a retransmission frequency and being determined based on a data loss rate of said first set of voice data packets received; and
   a voice transmitting part retransmitting said same set of voice data packets R times through the internet network according to said retransmission frequency information packet received,
   wherein said data loss rate is calculated by:

$$L=(T-D)/T$$

and $$T=M-N$$

where
   L is said data loss rate,
   T is a number of voice data packets supposed to be received during a time interval,
   D is a number of voice data packets received during said time interval,
   M is a maximum sequence number of said voice data packets received during said time interval, and
   N is a minimum sequence number of said voice data packets received during said time interval.

2. The internet telephone communication system of claim 1, wherein said time interval is set to 30 seconds.

3. The internet telephone communication system of claim 1, wherein each voice data packet includes a RTP protocol header region containing a corresponding packet sequence number and at least one data region.

4. The internet telephone communication system of claim 1, wherein said retransmission frequency information packet includes an IP header region, a UDP header region, a service identifier region being indicative of said retransmission frequency information packet, a session ID number region being newly assigned for each telephone call, and a retransmission frequency region.

5. The internet telephone communication system of claim 4, wherein said service identifier region, said session ID number region, and said retransmission frequency region have sizes of 4 bytes, 3 bytes, and 1 byte, respectively.

6. The internet telephone communication system of claim 5, wherein each retransmission frequency of 1, 2, 3 and 4 is represented as 0000 0001, 0000 0010, 0000 0100, and 0000 1000 in said retransmission frequency region, respectively.

7. An internet telephone communication system comprising:
   a voice receiving part receiving a first set of voice data packets through an internet network and sending a retransmission frequency information packet requesting to retransmit a same set of voice data packets R times, R being a retransmission frequency and being determined based on a data loss rate of said first set of voice data packets received; and
   a voice transmitting part retransmitting said same set of voice data packets R times through the internet network according to said retransmission frequency information packet received,
   wherein said voice transmitting part comprising:
   a formation time information adder for adding formation time information to compressively encoded voice data received;
   a copy generator for generating R copies of said compressively encoded voice data containing said formation time information; and
   a transmitting protocol processor for generating voice data packets based on said R copies generated and sending said voice data packets to said voice receiving part.

8. An internet telephone communication system comprising:
   a voice receiving part receiving a first set of voice data packets through an internet network and sending a retransmission frequency information packet requesting to retransmit a same set of voice data packets R times, R being a retransmission frequency and being determined based on a data loss rate of said first set of voice data packets received; and
   a voice transmitting part retransmitting said same set of voice data packets R times through the internet network according to said retransmission frequency information packet received,
   wherein said voice receiving part comprising:
   a data eliminator for leaving only one set of data among sets of compressed voice data that are repeatedly received and deleting all other data;
   a data loss determiner for determining whether said only set of data left is damaged and calculating a corresponding data loss rate; and
   a retransmission frequency determiner for determining a retransmission frequency based on said data loss rate and sending a retransmission frequency information packet containing said frequency to said transmitting part,
   wherein said retransmission frequency is determined by comparing said data loss rate with a first and second allowed data loss values set by a user, and
   wherein said first and second allowed data loss values are 5% and 1%, respectively, and said retransmission frequency increases by one if said data loss rate is greater than 5% and decreases by one if said data loss rate is less than 1%.

9. The internet telephone communication system of claim 8, wherein the maximum and minimum of said retransmission frequency are set to 4 and 1, respectively.

10. The internet telephone communication system of claim 8, wherein said data eliminator deletes other voice data received using formation time information attached to said voice data.

11. A method of operating an internet telephone communication system having a voice transmitting part and a voice receiving part, the method comprising the steps of:

calculating a data loss rate of voice data packets received during a given time interval by said voice receiving part;

updating a retransmission frequency by increasing said frequency by one if said data loss rate is greater than a maximum allowed value and decreasing said frequency by one if said data loss rate is less than a minimum allowed value, said maximum and minimum allowed values being set by a user;

transmitting a retransmission frequency information packet to said voice transmitting part, said information packet containing said updated frequency; and transmitting each voice data packet from said voice transmitting part to said voice receiving part R times, R being said updated frequency, wherein said data loss rate is calculated by:

$$L = (T-D)/T$$

and $$T = M - N$$

where

L is said data loss rate,

T is a number of voice data packets supposed to be received during said time interval, D is a number of voice data packets received during said time interval, M is a maximum sequence number of said voice data packets received during said time interval, and N is a minimum sequence number of said voice data packets received during said time interval.

12. The method of claim 11, wherein said time interval is set to 30 seconds.

13. The method of claim 11, wherein said frequency is not updated if said data loss rate is between said maximum allowed value and said minimum allowed value.

14. The method of claim 11, wherein the maximum and minimum of said updated frequency are set to 4 and 1, respectively.

15. The method of claim 11, wherein said maximum and minimum allowed values are set to 5% and 1%, respectively.

16. The method of claim 11, wherein each of said voice data packets received includes a RTP protocol header region containing a corresponding packet sequence number and at least one data region.

17. The method of claim 11, wherein said retransmission frequency information packet includes a IP header region, a UDP header region, a 4 bytes service identifier region, a 3 bytes session ID number region, and 1 byte retransmission frequency region.

* * * * *